Nov. 3, 1970 E. I. VALYI 3,537,133
APPARATUS FOR MAKING PLASTIC CONTAINERS
Original Filed Oct. 6, 1965 2 Sheets-Sheet 1

INVENTOR.
Emery I. Valyi
BY
ATTORNEY

Nov. 3, 1970　　　　　　　　E. I. VALYI　　　　　　　3,537,133
APPARATUS FOR MAKING PLASTIC CONTAINERS
Original Filed Oct. 6, 1965　　　　　　　　　　　2 Sheets-Sheet 2

INVENTOR.
Emery I. Valyi
BY
ATTORNEY

United States Patent Office 3,537,133
Patented Nov. 3, 1970

3,537,133
APPARATUS FOR MAKING PLASTIC CONTAINERS
Emery I. Valyi, 5200 Sycamore Ave.,
New York, N.Y. 10071
Original application Oct. 6, 1965, Ser. No. 493,328, now Patent No. 3,336,425, dated Aug. 15, 1967. Divided and this application June 7, 1967, Ser. No. 662,219
Int. Cl. B29d 23/03; B65b 47/08
U.S. Cl. 18—5                                    7 Claims

ABSTRACT OF THE DISCLOSURE

Injection molding apparatus including a parison die in which a parison is injected on to a blow core, a blow mold in axial alignment with the parison die, means shifting the blow core with the parison thereon in a straight path from the parison die into the blow mold and blowing, means separating the blow core from the parison in the blow mold, means shifting the blow mold transversely out of the path of the blow core, and means returning the blow core to the parison die. Filling means is provided to fill the blown article while in the blow mold after the blow mold has been shifted transversely to a discharge position.

---

Figure 1:
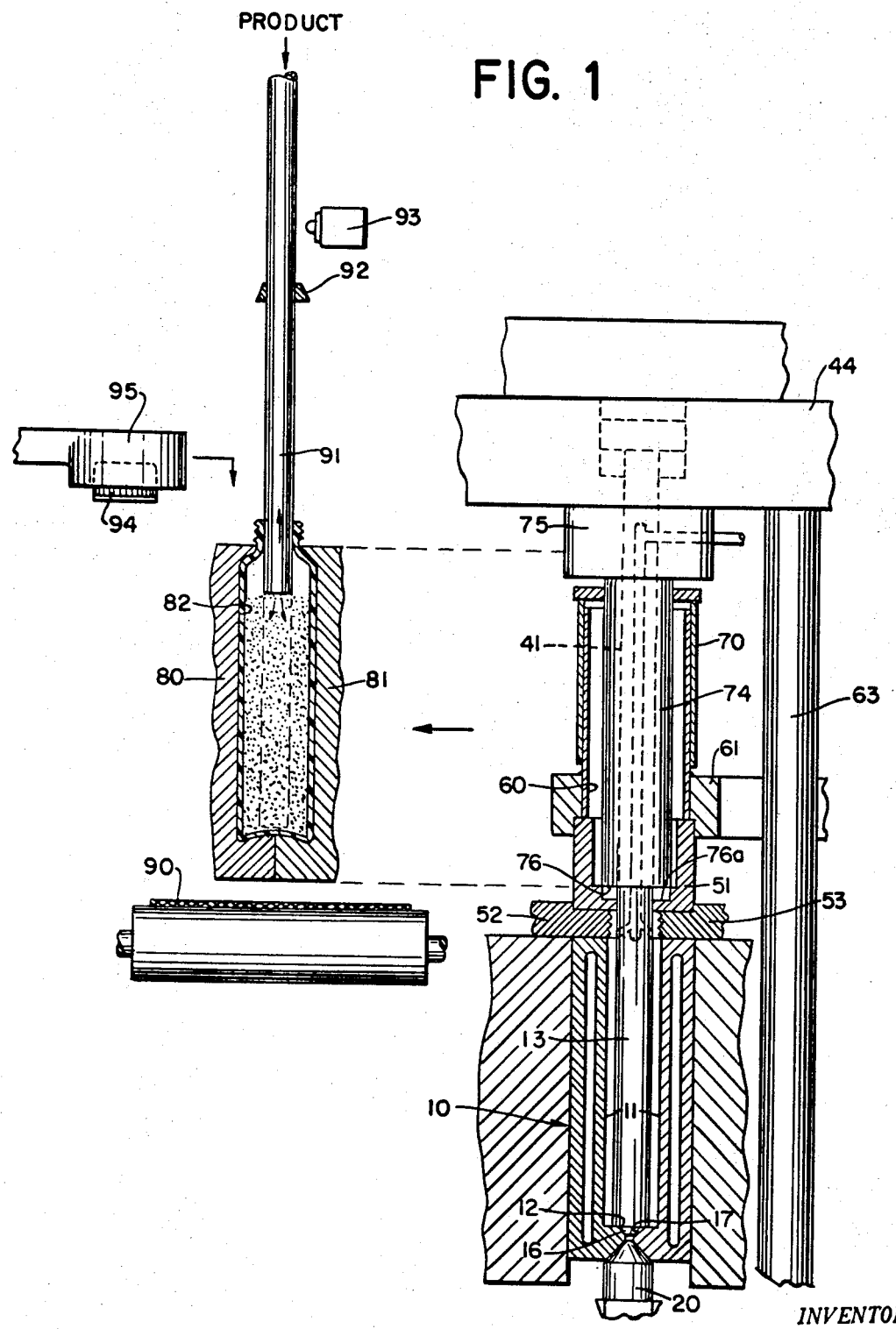

This application is a division of copending application Ser. No. 493,328 filed Oct. 6, 1965, now Pat. No. 3,336,425 dated Aug. 15, 1967.

This invention related to apparatus for making and filling plastic containers and has for an object to provide apparatus of the above type having novel and improved characteristics.

The invention is particularly applicable to molding operations of the type wherein a parison is formed on a blow core in a parison die and is transferred with the blow core into a blow mold wherein it is blown or expanded into the desired form.

A feature of the invention is the transverse shifting of the blow mold out of the axial path of the blow core to a discharge station after the blowing operation has been completed.

Further, a feature of the invention is the filling of a blown plastic container while in the blow mold. The filling may take place in the blow station after the blow core has been withdrawn and while the walls of the container are confined and supported by the blow mold. If the filling material is in a cold state the filling at this station facilitates the cooling of the container as well as eliminating a separate filling step.

In molding apparatus of the type wherein the blow mold with the blown container therein is shifted out of the path of the blow core in advance of the next parison injection step the filling may take place while the container is still in the blow mold in the discharge station after which the blow mold is opened and the filled container discharged onto a conveyor or other receiver. In this way a separate filling step is eliminated and the container can be filled under a substantial pressure as the container walls are confined and supported by the blow mold during the filling operation.

The nature of the invention will be better understood from the following description taken in connection with the accompanying drawings in which certain specific embodiments have been set forth for purposes of illustration.

Figure 2:
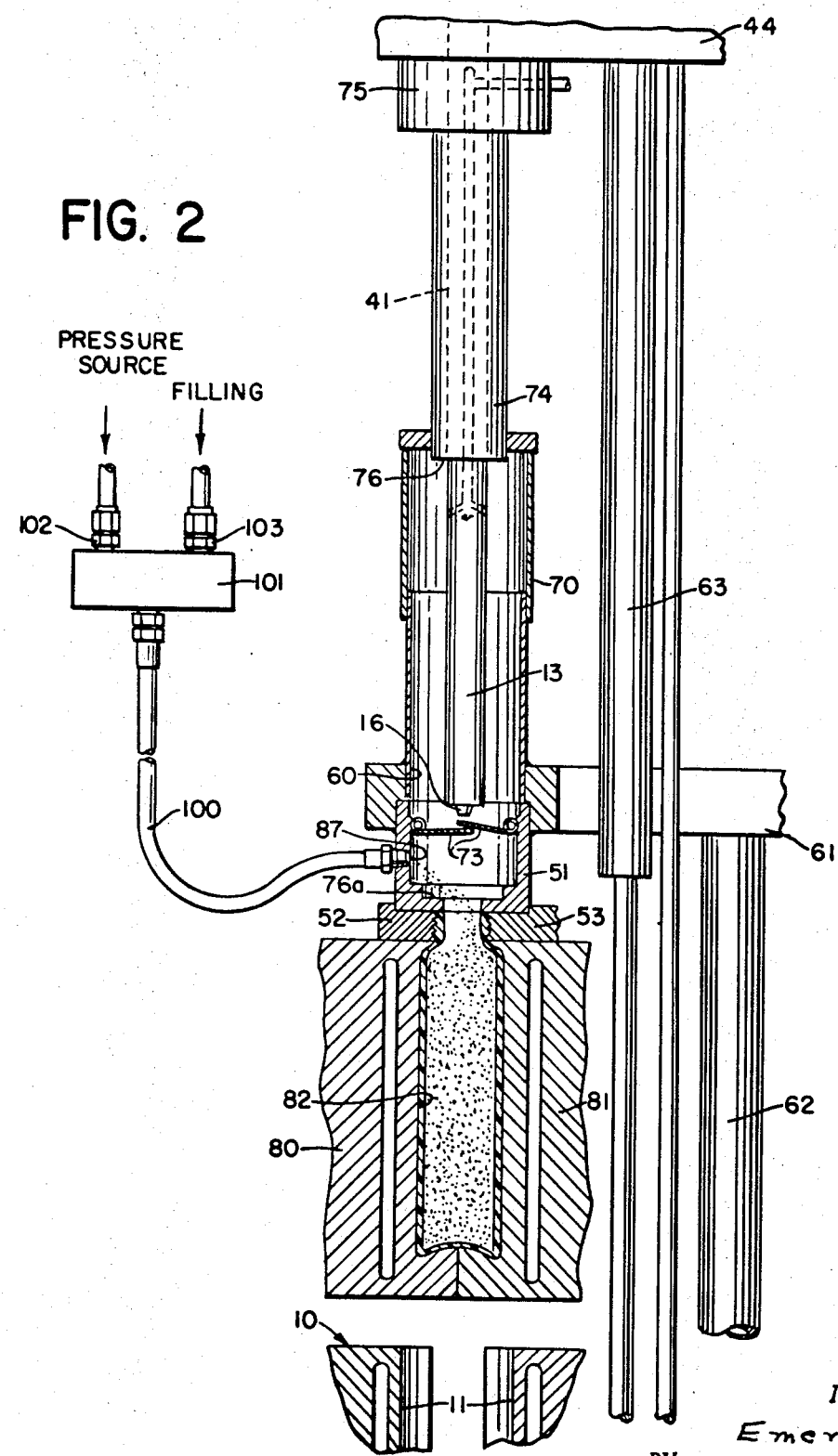

In the drawings:

FIG. 1 is an elevation partly in section showing a blow molding machine wherein the blow core is seated within a parison die and a blow mold is disposed in discharge position; and FIG. 2 is an elevation partly in section showing the blow core retracted and a formed container within a blow mold.

Referring to the drawings more in detail the apparatus is shown as comprising a parison die composed of a separable outer die member 10 which contains fluid channels for purposes of temperature control, having side walls 11 and bottom wall 12, and a blow core 13 which is adapted to seat against the bottom wall 12 of the outer die member 10 and carries a convex centering pin 16 seating in a corresponding recess 17 in the bottom wall 12.

An injection nozzle 20 communicates with the die space between the side walls 11 of the outer die member and the side wall of the blow core in which the parison is to be formed.

The blow core 13 is connected by a blow core rod 41 to a piston adapted to slide in a cylinder formed in a cross head 44.

The neck of the parison is pressure molded in a neck ring which is mounted on a carrier 51 and is composed of two parts 52 and 53 which contain cooling channels and which are adapted to be opened to release the neck of the formed bottle.

The carrier 51 is mounted with a sleeve 60 on a cross head 61 which is adapted to be advanced or retracted by a hydraulic cylinder 62. A similar hydraulic cylinder 63 is connected to actuate the cross head 44.

The cross head 44 carries a cylinder 70 into which the sleeve 60 slides to form an extensible chamber into which the blow core 13 is retractable for cooling and conditioning. The sleeve 60 carries at its lower end a set of trap doors 73 for closing the conditioning chamber. A sleeve 74 extends around the blow core rod 41 from an extension 75 of the cross head 44 and at its lower end carries a shoulder 76 which is adapted to seat in a recess 76a in the neck ring carrier 51 so that the neck ring and the core are caused to move as a unit between the upper position of the neck ring and the lower parison injection position of the core.

In the parison forming position of FIG. 1, the neck ring is held against the outer parison die members 10 to form, with the blow core, an extension of the parison die in which the neck portion of the parison is molded.

After the parison has been molded, the outer die member 10 is opened to release the parison and the blow core 13 with the formed parison thereon, together with the neck ring, is retracted from the parison die into blow position by suitably elevating the cross head 61 by means of the actuating cylinder 62. This raises the neck ring and its carrier 51 and through the sleeve 74 raises the cross head 44 and the blow core 13 which is carried thereby. In this position a blow mold comprising parts 80 and 81 is brought into position and closed around the parison and below the neck ring. The blow mold is formed with a cavity 82 into which the parison is blown by introducing air or other fluid under pressure through an axial passage in the blow core 13 to form the container.

After the container has been blown, the blow core 13 is retracted into the conditioning chamber. For this purpose the cross head 44 is raised by the actuating cylinder 63 while the cross head 61 remains fixed. This causes the cylinder 70 to slide over the sleeve 60 to form an elongated conditioning chamber and pulls the blow core through the neck of the container and into the chamber. Air under pressure is supplied through passage 87 in the sleeve 60 above the neck ring for maintaining the container under pressure while cooling in the blow mold. The blow mold is usually provided with passages for cooling fluid, as shown.

After sufficient cooling of the container in the blow mold, neckring is opened to release the neck of the formed container or, if necessary, the neck ring may be opened and raised by further elevating the cross head 61 by means of cylinder 62. The blow mold is then shifted transversely out of the path of the blow core and the blow core and neck ring returned to parison forming position.

For filling the container while still confined within the blow mold, a filling tube 91 is disposed to be inserted into the container to a point near the bottom thereof and to be gradually retracted as the container is filled. When the tube 91 has been retracted to a point at which the container has been completely filled, a collar 92 on the tube 91 engages a micro-switch 93 to interrupt the supply of filling material to the tube. The tube is then retracted out of the container and a cap 94 is affixed thereto by suitable capping mechanism indicated as arm 98. The mold parts 80 and 81 are then opened and the filled container discharged onto a conveyor 90.

Since the walls of the container are confined and supported by the blow mold during the filling operation the container may be filled under a substantial pressure, also the cooling of the container walls is facilitated by the introduction of a cold filling material at this stage.

The device here illustrated may, if desired, operate using two blow molds, rather than only the one shown in the figures such that one of the two is in or near the bottle filling position while the other is in or near the blowing position. Each of such a pair of blow molds has its own bottle filling position, usually symmetrically arranged in relation to the blowing position.

The various steps above described may be controlled by any suitable program device such as a series of cams or cam-actuated switches, not shown. Only so much of the apparatus has been shown as is necessary for an understanding of the operation of the device.

In the embodiment of FIG. 2 the parts are similar to those above described and have been given the same reference numbers. In this embodiment, however, provision is made for filling the container while the blow mold is still in blow position. For this purpose the passage 87 which communicates with the chamber 51 is connected by a pipe 100 to a manifold 101 which is provided with an inlet duct 102 adapted to supply a fluid under pressure for maintaining fluid pressure within the blown container in the blow mold and with a duct 103 connected to receive a filling material which may also be supplied under pressure.

In this embodiment after the container has been blown and the blow core retracted, suitable filling material preferably in a cool state is supplied from the duct 103 through the passage 87 and chamber 51 into the blown container. After a measured quantity of material has been supplied, the filling material may be interrupted and air under pressure supplied from the duct 102 to purge the passage 87 and the chamber 51 of filling material and to compact the material within the container. The blow mold with the filled container therein may then be transferred to discharge position as shown in FIG. 1. This embodiment is particularly effective when a cold fluid is to be introduced into the container. The introduction of the cold fluid at this point materially increases the cooling rate with a consequent reduction in the time required for the complete cycle. It also avoids distortion of the container which is supported by the surrounding blow mold, while hot and therefore too weak for handling and filling when unsupported.

What is claimed is:
1. Apparatus for making and filling a container comprising a blow mold, a blow core adapted to carry a parison, means introducing the blow core with the parison thereon into said blow mold, means blowing the parison into container form in said blow mold, means separating the blow core from the blown container in said blow mold, a pressure chamber communicating with said container in said blow mold, closure means for said pressure chamber, means retracting said blow core through said pressure chamber and through said closure means and means supplying a filling material into said chamber for filling said container.

2. Apparatus as set forth in claim 1, including means supplying a purging fluid to said chamber for purging the filling material therefrom after the filling operation has been completed.

3. Apparatus for making and filling a container comprising a blow mold, a blow core adapted to carry a parison, means introducing the blow core with the parison thereon into said blow mold, means blowing the parison into container form in said blow mold, means separating the blow core from the blown container in said blow mold, means shifting said blow mold transversely out of the path of the blow core from blow position to a discharge position and filling means located at said discharge position.

4. Apparatus as set forth in claim 3, in which said filling means comprises a filling tube to be inserted into said container and to be retracted as the container is filled and means interrupting the supply of filling material when said tube is fully retracted from the filled container.

5. Apparatus as set forth in claim 3 including means for applying a cap to the filled container prior to removal from said blow mold.

6. Apparatus for forming a hollow object of flowable organic plastic material comprising a parison die having an outer die member and a blow core, means introducing said plastic material into the parison die through said outer die member for forming the parison on said blow core, a blow mold adapted to cooperate with said blow core at a blow station spaced from said parison die and shiftable transversely into and out of the path of said blow core, means shifting said blow core with the formed parison thereon in a predetermined path from said parison die and introducing the same into said blow mold at said blow station, means supplying fluid pressure through the blow core to expand the parison into the blow mold for forming the hollow object, means separating said blow core from the formed hollow object in said blow mold, means shifting said blow mold and said hollow object transversely out of the path of the blow core and means returning the blow core along said path to its initial position in said parison die.

7. Apparatus according to claim 6 further characterized by a neck ring mounted independently of said outer die member and cooperating with said blow core to form the neck of the parison, means retracting said neck ring with the blow core from the parison die to the position of said blow mold and means releasing the neck of the hollow object from said neck ring prior to the transverse shifting of the blow mold.

References Cited

UNITED STATES PATENTS

| | | |
|---|---|---|
| 3,172,929 | 3/1965 | Santelli. |
| 3,196,592 | 7/1965 | Chaney _____ 53—140 |
| 3,216,176 | 11/1965 | Grosclaude et al. ___ 53—140 X |
| 3,337,667 | 8/1967 | Ninneman. |
| 3,390,431 | 7/1968 | Valyi. |

WILBUR L. McBAY, Primary Examiner

U.S. Cl. X.R.

53—140